(12) United States Patent
Tsuda et al.

(10) Patent No.: US 9,063,403 B2
(45) Date of Patent: *Jun. 23, 2015

(54) PROJECTOR HAVING FLUORESCENT BODY AND ASSOCIATED SENSOR

(71) Applicant: SEIKO EPSON CORPORATION, Toyko (JP)

(72) Inventors: Masahide Tsuda, Shiojiri (JP); Osamu Saito, Matsumoto (JP); Kenichi Shioiri, Matsumoto (JP); Shigehiro Yanase, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,781

(22) Filed: Sep. 10, 2014

(65) Prior Publication Data

US 2014/0375968 A1    Dec. 25, 2014

Related U.S. Application Data

(63) Continuation of application No. 13/189,171, filed on Jul. 22, 2011, now Pat. No. 8,858,000.

(30) Foreign Application Priority Data

Aug. 26, 2010   (JP) .................................. 2010-189681

(51) Int. Cl.
*G03B 21/20*        (2006.01)
*H04N 9/31*         (2006.01)

(52) U.S. Cl.
CPC ............ *G03B 21/204* (2013.01); *H04N 9/3155* (2013.01); *H04N 9/3182* (2013.01); *G02B 2207/113* (2013.01); *H04N 9/3158* (2013.01); *H04N 9/3194* (2013.01)

(58) Field of Classification Search
CPC ............... G03B 21/20; G03B 21/2013; G03B 21/2033; G03B 21/204; H04N 9/31; H04N 9/312; H04N 9/315; H04N 9/3152; H04N 9/3155; H04N 9/3158; H04N 9/3161; H04N 9/3164; H04N 9/3179; H04N 9/3182; H04N 9/3194; H04N 9/3197
USPC .......... 353/31, 84–85, 94, 122; 359/885, 887, 359/889–892; 315/360; 362/84
See application file for complete search history.

(56) References Cited

U.S. PATENT DOCUMENTS 6,874,893 B2 *  4/2005  Park ................................ 353/84
7,048,390 B2 *  5/2006  Kitabayashi .................. 353/119

(Continued)

FOREIGN PATENT DOCUMENTS

JP    A-2000-267621    9/2000
JP    A-2002-045329    2/2002

(Continued)

OTHER PUBLICATIONS

Aug. 22, 2013 Office Action issued in U.S. Appl. No. 13/189,171.

(Continued)

*Primary Examiner* — Jori S Reilly-Diakun
(74) *Attorney, Agent, or Firm* — Oliff PLC (57) ABSTRACT

A projector includes a light source that emits excitation light, a fluorescent body that converts the excitation light into fluorescence, a liquid crystal optical modulation device that modulates light output from the fluorescent body, an optical sensor that detects at least one of the excitation light passing through the fluorescent body and the fluorescence converted by the fluorescent body, and a control device that controls at least one of the light source and the liquid crystal optical modulation device based on a detection result of the optical sensor.

15 Claims, 6 Drawing Sheets

(56) References Cited

U.S. PATENT DOCUMENTS

| | | | |
|---|---|---|---|
| 7,270,425 B2 | 9/2007 | Arai et al. | |
| 7,466,499 B2 | 12/2008 | Takeuchi et al. | |
| 7,791,561 B2 | 9/2010 | Hajjar et al. | |
| 7,887,189 B2 | 2/2011 | Mizouchi et al. | |
| 7,959,303 B2 | 6/2011 | Nishioka et al. | |
| 7,993,004 B2* | 8/2011 | Chen | 353/20 |
| 8,038,299 B2* | 10/2011 | Inoue | 353/31 |
| 8,070,296 B2 | 12/2011 | Hiranuma et al. | |
| 8,123,360 B2* | 2/2012 | Hasegawa | 353/30 |
| 8,123,367 B2 | 2/2012 | Nagashima et al. | |
| 8,231,227 B2 | 7/2012 | Kurosaki | |
| 8,354,790 B2 | 1/2013 | Iwanaga | |
| 8,393,741 B2 | 3/2013 | Fukano | |
| 8,485,669 B2* | 7/2013 | Katou et al. | 353/31 |
| 2002/0016620 A1 | 2/2002 | Tsujita | |
| 2005/0007561 A1* | 1/2005 | Koyama et al. | 353/94 |
| 2007/0070309 A1 | 3/2007 | Stern | |
| 2007/0229774 A1* | 10/2007 | Hosokawa | 353/53 |
| 2009/0284148 A1 | 11/2009 | Iwanaga | |
| 2010/0128226 A1 | 5/2010 | Shibasaki | |
| 2010/0149496 A1 | 6/2010 | Inoue | |
| 2010/0245777 A1 | 9/2010 | Ogura | |
| 2011/0075103 A1 | 3/2011 | Ogawa et al. | |
| 2011/0096301 A1* | 4/2011 | Koyama | 353/88 |
| 2012/0008098 A1 | 1/2012 | Akiyama | |
| 2012/0236264 A1 | 9/2012 | Akiyama | |
| 2012/0249976 A1 | 10/2012 | Shibasaki et al. | |
| 2012/0274678 A1 | 11/2012 | Oda | |

FOREIGN PATENT DOCUMENTS

| | | |
|---|---|---|
| JP | A-2002-323675 | 11/2002 |
| JP | A-2005-085871 | 3/2005 |
| JP | A-2009-510518 | 3/2009 |
| JP | A-2010-152326 | 7/2010 |
| JP | A-2011-70088 | 4/2011 |

OTHER PUBLICATIONS

Mar. 20, 2014 Office Action issued in U.S. Appl. No. 13/189,171.
Jun. 10, 2014 Notice of Allowance in U.S. Appl. No. 13/189,171.

* cited by examiner

PROJECTOR HAVING FLUORESCENT BODY AND ASSOCIATED SENSOR

This is a Continuation of U.S. application Ser. No. 13/189,171 filed Jul. 22, 2011, which claims priority to JP2010-189681 filed Aug. 26, 2010. The prior applications, including the specifications, drawings and abstracts are incorporated herein by reference in their entirety.

BACKGROUND

1. Technical Field

The present invention relates to a projector.

2. Related Art

As is widely known, a projector is a device that includes a light source, an optical modulation device, and a projection lens and displays an image on a screen by modulating light emitted from the light source by using the optical modulation device and projecting the modulated light onto the screen by using the projection lens. Generally, projectors include a lamp such as a halogen lamp, a metal halide lamp, or a high-pressure mercury lamp as the light source. However, recently, in order to achieve low power consumption, miniaturization, lightness, and the like, projectors including solid-state light sources such as an LD (Laser Diode) and an LED (Light Emitting Diode) have been actively developed.

As one type of projector including a solid-state light source, there is a projector in which red light, blue light, and green light necessary for color display are acquired by exciting a fluorescent body using light (for example, blue laser beams or ultraviolet laser beams) emitted from the solid-state light source. By acquiring three types of color light (red light, blue light, and green light) necessary for color display by using only one solid-state light source, such a projector can achieve cost reduction, miniaturization, and the like, compared to a case where the projector includes a plurality of solid-state light sources.

In JP-A-2005-85871 and JP-A-2002-45329, a technology for preventing an unnecessary increase in the optical output in a device having a solid-state light source such as an LD is disclosed. To be more specific, in JP-A-2005-85871, a sensor (for example, a light-intensity sensor) that detects the operation status of a laser oscillation unit is arranged, a reference value (reference range) of a signal transmitted from the sensor corresponding to each control amount for the laser oscillation unit is stored, and the abnormality of the sensor is determined based on the signal acquired from the sensor, the stored reference value, and the like so as to stop the laser beam. In addition, in JP-A-2002-45329, the output of excitation light emitted from a semiconductor laser is detected, and the operation of the semiconductor laser is stopped in a case where the output of the excitation light is equal to or more than a set value.

As described above, since the projector needs to project light modulated by the optical modulation device onto the screen, the projector includes a solid-state light source having a high-level output. In the projector including the solid-state light source having a high-level output and the above-described fluorescent body, in a case where the fluorescent body is damaged, there is a concern that light having the high-level output that is emitted from the solid-state light source will be directly output to the outside of the projector. Accordingly, in such a projector, similarly to the devices disclosed in JP-A-2005-85871 and JP-A-2002-45329 described above, a countermeasure for preventing the light emitted from the solid-state light source from being directly output to the outside is necessary.

Here, according to the above-described technologies disclosed in JP-A-2005-85871 and JP-A-2002-45329, in a case where the optical output of the solid-state light source increases to be equal to or more than a predetermined value, abnormality is determined, and the solid-state light source is stopped or the like. Thus, in a case where the optical output of the solid-state light source is within a normal range, the determination of abnormality is not made. Accordingly, in the technologies disclosed in JP-A-2005-85871 and JP-A-2002-45329, a problem (a problem that the light having a high-level output emitted from the solid-state light source is directly output to the outside of the projector) that may occur due to damage in the above-described fluorescent body cannot be prevented.

In addition, in a case where the fluorescent body is degraded, the balance of three types of light (the red light, the blue light, and the green light) that are necessary for color display may collapse, so that the color of an image displayed on the screen changes from the original color. Furthermore, since the degradation of the fluorescent body is promoted in accordance with a rise in the temperature, in a case where the solid-state light source is driven without the degradation of the fluorescent body being considered at all regardless of the actual occurrence of the degradation of the fluorescent body, the lifetime of the fluorescent body may be much shortened. Accordingly, in the projector including a fluorescent body, in order to prevent the occurrence of a color change and to lengthen the lifetime, it is important to check the degraded status of the fluorescent body.

SUMMARY

An advantage of some aspects of the invention is that it provides a projector capable of preventing a situation in which light emitted from a solid-state light source is directly output to the outside due to damage in a fluorescent body while checking the degraded status of the fluorescent body.

An aspect of the invention is directed to a projector including: a solid-state light source that emits excitation light; a fluorescent body that converts the excitation light into fluorescence; an optical modulation device that modulates light output from the fluorescent body; a projection optical system that projects the light modulated by the optical modulation device on a screen; a detection device that detects at least one of the excitation light passing through the fluorescent body and the fluorescence converted by the fluorescent body; and a control device that controls at least one of the solid-state light source and the optical modulation device based on a detection result of the detection device.

According to the above-described projector, at least one of the excitation light passing through the fluorescent body and the fluorescence converted by the fluorescent body is detected by the detection device, and at least one of the solid-state light source and the optical modulation device is controlled based on a detection result of the detection device by the control device. Therefore, a situation in which light emitted from the solid-state light source is directly output to the outside due to damage in the fluorescent body can be prevented while checking the degraded status of the fluorescent body.

The above-described projector may be configured such that the detection device is disposed at a position deviated from an optical path between the fluorescent body and the optical modulation device and detect leakage light, which is not input to the optical modulation device, out of light output from the fluorescent body to the optical modulation device.

The above-described projector may be configured to further include: a reflection optical system that is disposed on an optical path between the fluorescent body and the optical modulation device and reflects a part of light output from the fluorescent body, wherein the detection device is disposed at a position deviated from the optical path between the fluorescent body and the optical modulation device and detects light reflected by the reflection optical system.

In such cases, the detection device can detect the light output from the fluorescent body without blocking the light that is output from the fluorescent body and is incident to the optical modulation device.

The above-described projector may be configured such that the detection device is disposed at a position deviated from an optical path between the solid-state light source and the fluorescent body and detect reflection light of the excitation light that is incident to the fluorescent body.

In such a case, since the reflection light of the excitation light that is incident to the fluorescent body is detected by the detection device, the detection device can be disposed on the front side (light source side) of the fluorescent body, whereby the degree of freedom of arranging the detection device can be increased.

The above-described projector may be configured such that the detection device detects at least one of the excitation light passing through the fluorescent body and the fluorescence converted by the fluorescent body for light of each color.

In such a case, since at least one of the excitation light passing through the fluorescent body and the fluorescence converted by the fluorescent body is detected for light of each color, for example, red light, green light, and blue light can be individually detected. Accordingly, the degradation of the fluorescent body and the like can be checked more accurately, whereby the reliability and the accuracy of the control process can be improved.

The above-described projector may be configured such that the control device performs control of stopping emission of the excitation light for the solid-state light source and perform control of lowering transmittance of light for the optical modulation device.

In such a case, since a control process in which light emission of the solid-state light source is stopped and the transmittance of the optical modulation device is lowered is performed by the control device, the safety can be further improved.

The above-described projector may be configured to further include a monitoring device that monitors a power supply status for the solid-state light source, wherein the control device controls the solid-state light source while referring to a monitoring result of the monitoring device.

In such a case, the power supply status of the solid-state light source can be checked as well, and accordingly, the reliability and the accuracy of the control process can be improved.

The above-described projector may be configured to further include a rotary fluorescent plate in which the fluorescent body is continuously formed along a circumferential direction of a circular plate that can be rotated by a motor.

In such a case, since the excitation light from the solid-state light source is emitted to the fluorescent body that is continuously formed along the circumferential direction of the circular plate rotated by the motor, the degradation due to overheating the fluorescent body and a decrease in the light emission efficiency can be suppressed.

The above-described projector may be configured such that the solid-state light source emits blue light as the excitation light, and the fluorescent body converts the blue light emitted from the solid-state light source into light including red light and green light.

In such a case, the red light, the green light, and the blue light that are necessary for color display can be acquired by using the solid-state light source that emits the blue light.

The above-described projector may be configured such that the solid-state light source emits violet light or ultraviolet light as the excitation light, and the fluorescent body converts the violet light or the ultraviolet light emitted from the solid-state light source into light including red light, green light, and blue light.

In such a case, the red light, the green light, and the blue light that are necessary for color display can be acquired by using the solid-state light source that emits violet light or ultraviolet light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, projectors according to embodiments of the invention will be described with reference to the accompanying drawings. The embodiments described below represent some aspects of the invention, are not for the purpose of limiting the scope of the invention, and may be arbitrarily changed within the scope of the technical concept of the invention.

First Embodiment

Figure 1:
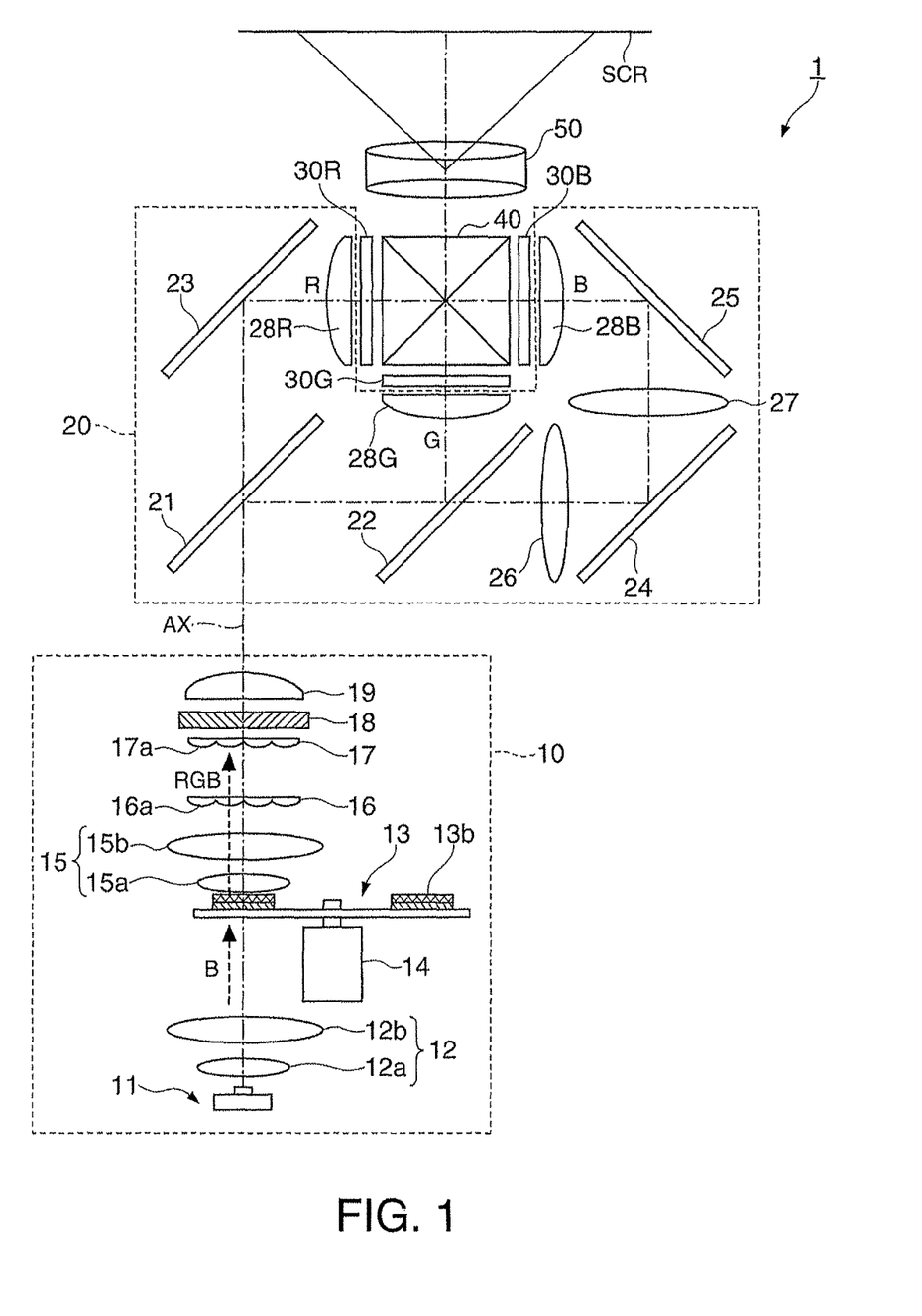
FIG. 1 is a plan view showing the entire configuration of a projector according to a first embodiment of the invention.

FIG. 1 is a plan view showing the entire configuration of a projector according to a first embodiment of the invention. As shown in FIG. 1, the projector 1 includes an illumination device 10, a color separating light guiding optical system 20, liquid crystal optical modulation devices 30R, 30G, and 30B (optical modulation devices), a cross dichroic prism 40, and a projection optical system 50. The projector 1 displays an image on a screen SCR by projecting image light according to an image signal input from the outside toward the screen SCR.

The illumination device 10 includes a solid-state light source 11, a light collecting optical system 12, a rotary fluorescent plate 13, a motor 14, a collimator optical system 15, a first lens array 16, a second lens array 17, a polarization converting device 18, and a superposing lens 19 and emits white light that includes red light, green light, and blue light. The solid-state light source 11 emits blue light (peak of emission intensity: about 445 nm, see FIG. 3A) that is formed by laser beams as excited light.

As this solid-state light source 11, for example, a light source including a single semiconductor laser device or a light source including a plurality of semiconductor laser devices formed so as to be arranged on a face can be used. By using the light source including a plurality of semiconductor laser devices, blue light having a high output can be acquired. Here, an example will be described in which the solid-state light source 11 emits blue light having a peak of the emission intensity of 445 nm. However, a solid-state light source having a peak of the emission intensity (for example, about 460 nm) other than that can be used. The light collecting optical system 12 includes a first lens 12a and a second lens 12b. The light collecting optical system 12 is disposed on an optical path between the solid-state light source 11 and the rotary fluorescent plate 13 and collects the blue light emitted from the solid-state light source 11 at a position near the rotary fluorescent plate 13.

Figure 2A:
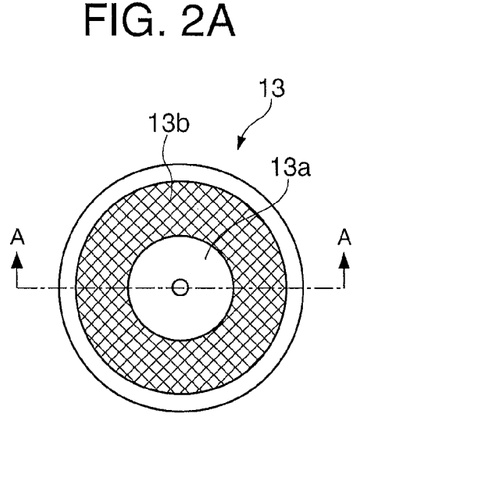
FIGS. 2A and 2B are diagrams showing the configuration of a rotary fluorescent plate that is disposed in the projector according to the first embodiment of the invention.
Figure 2B:
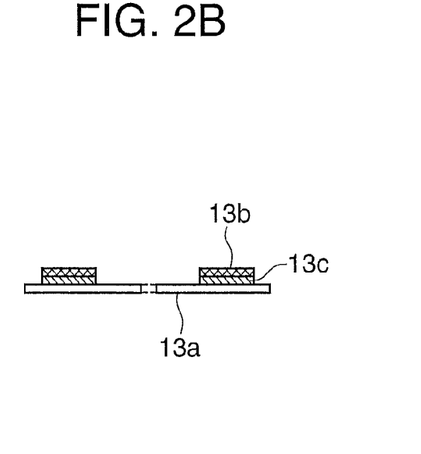

The rotary fluorescent plate 13 converts a part of the blue light as excitation light collected by the light collecting optical system 12 into fluorescence including red light and green light and is supported to be freely rotatable by the motor 14. FIGS. 2A and 2B are diagrams showing the configuration of the rotary fluorescent plate that is disposed in the projector according to the first embodiment of the invention. FIG. 2A is a front view and FIG. 2B is a cross-sectional fragmentary view taken along line A to A shown in FIG. 2A. As shown in FIGS. 2A and 2B, in the rotary fluorescent plate 13, a fluorescent body 13b as a single fluorescent layer is formed to be continuous along the circumferential direction of a transparent circular plate 13a on one face of the circular plate 13a.

The circular plate 13a is formed by using a material such as quartz glass, crystal, sapphire, optical glass, or a transparent resin that transmits blue light. In a center portion of the circular plate 13a, a hole is formed into which the rotation shaft of the motor 14 is inserted. The fluorescent body 13b converts a part of the blue light transmitted from the solid-state light source 11 into light (fluorescence) including red light and green light and transmits the remaining part of the blue light without being converted. As this fluorescent body 13b, for example, a fluorescent body that contains $(Y,Gd)_3(Al,Ga)_5O_{12}$:Ce as a YAG-based fluorescent body can be used. This fluorescent body 13b, as shown in FIG. 2B, is formed on one face of the circular plate 13a through a dichroic film 13c that transmits blue light and reflects red light and green light.

Figure 3A:
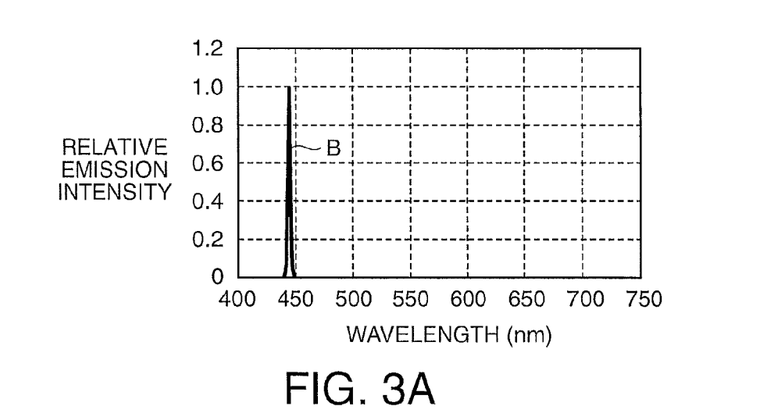
FIGS. 3A and 3B are diagrams showing the characteristics of a fluorescent body of the rotary fluorescent plate disposed in the projector according to the first embodiment of the invention.
Figure 3B:
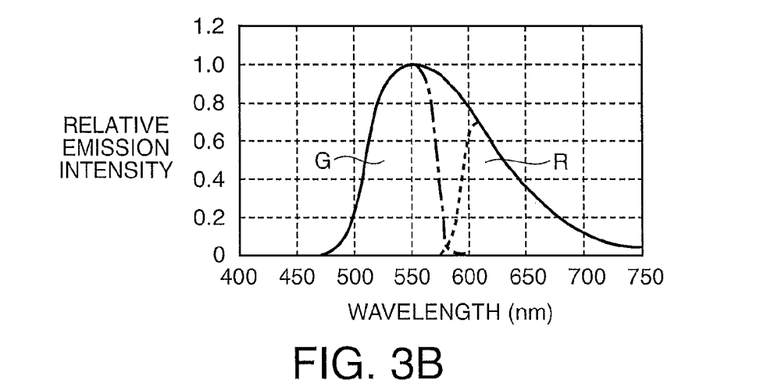

FIGS. 3A and 3B are diagrams showing the characteristics of the fluorescent body of the rotary fluorescent plate disposed in the projector according to the first embodiment of the invention. FIG. 3A is a diagram showing the spectrum of blue light that is incident to the fluorescent body, and FIG. 3B is a spectrum of fluorescence converted by the florescent body. The fluorescent body 13b formed in the rotary fluorescent plate 13 converts a part of blue light (B) having the spectrum shown in FIG. 3A into yellow light (fluorescence) that includes red light (R) and green light (G) shown in FIG. 3B.

Here, a reference sign B shown in FIG. 3A represents a color light component that is emitted by the solid-state light source 11 as excitation light (blue light). In addition, a reference sign R shown in FIG. 3B represents a color component, which can be used as red light, of the fluorescence that is converted by the fluorescent body 13b, and a reference sign G shown in FIG. 3B is a color component, which can be used as green light, of the fluorescence converted by the fluorescent body 13b. In other words, by allowing the blue light to be incident to the fluorescent body 13b, three types of color light that are necessary for a color display are acquired as the red light and the green light converted by the fluorescent body 13b and the blue light that is transmitted through the fluorescent body 13b.

The rotary fluorescent plate 13 having the above-described configuration is disposed such that a face having the fluorescent body 13b formed thereon faces a side opposite to a side to which the blue light is incident so as to allow the blue light emitted from the solid-state light source 11 to be incident to the fluorescent body 13b from the circular plate 13a side. In addition, the rotary fluorescent plate 13, in the state of being driven by the motor 14 so as to rotate, is disposed near a light collection position of the light collecting optical system 12 such that the blue light is constantly incident to the area in which the fluorescent body 13b is formed.

When being used, the rotary fluorescent plate 13 is driven to rotate at 7500 rpm by the motor 14. The diameter of the rotary fluorescent plate 13 is 50 mm, and the incident position of the blue light collected by the light collecting optical system 12 with respect to the rotary fluorescent plate 13 is set to a position that is apart from the rotation center of the rotary fluorescent plate 13 by about 22.5 mm. In other words, the rotary fluorescent plate 13 is driven by the motor so as to rotate at a rotation speed for which a light-collecting spot of the blue light moves on the fluorescent body 13b at about 18 m/second.

Referring back to FIG. 1, the collimator optical system 15 includes a first lens 15a and a second lens 15b and approximately parallelizes the light output from the rotary fluorescent plate 13. The first lens array 16 includes a plurality of small lenses 16a and divides the light that is approximately parallelized by the collimator optical system 15 into a plurality of partial luminous fluxes. To be more specific, the plurality of small lenses 16a included in the first lens array 16 is arranged in a matrix shape that extends in a plurality of rows and a plurality of columns within a plane perpendicular to an illumination optical axis AX. The outer shape of the plurality of small lenses 16a included in the first lens array 16 is approximately similar to the outer shape of the image forming areas of the liquid crystal optical modulation devices 30R, 30G, and 30B.

The second lens array 17 has a plurality of small lenses 17a corresponding to the plurality of small lenses 16a disposed in the first lens array 16. In other words, the plurality of small lenses 17a included in the second lens array 17, similarly to the plurality of small lenses 16a included in the first lens array 16, is arranged in a matrix shape extending in a plurality of rows and a plurality of columns within a plane perpendicular to the illumination optical axis AX. This second lens array 17, together with the superposing lens 19, forms images of the small lenses 16a included in the first lens array 16 near the image forming areas of the liquid crystal optical modulation devices 30R, 30G, and 30B.

The polarization converting device 18 has a polarization separation layer, a reflection layer, and a retardation film (all of them are not shown in the figure). The polarization converting device 18 outputs the partial luminous fluxes divided by the first lens array 16 as linear polarized light of approximately one type of which the polarization direction is uniform. Here, the polarization separation layer directly transmits one linear polarized component out of polarized components included in the light output from the rotary fluorescent plate 13 and reflects the other linear polarized component in a direction perpendicular to the illumination optical axis AX. In addition, the reflection layer reflects the other linear polarized component reflected by the polarization separating layer in a direction parallel to the illumination optical axis AX. Furthermore, the retardation film converts the other linear polarized component reflected by the reflection layer into the one linear polarized component.

The superposing lens 19 is disposed such that the optical axis thereof coincides with the optical axis of the illumination device 10. The superposing lens 19 collects the partial luminous fluxes output from the polarization converting device 18 and overlaps the partial luminous fluxes output from the polarization converting device 18 at a position near the image forming areas of the liquid crystal optical modulation devices 30R, 30G, and 30B. The first lens array 16, the second lens array 17, and the superposing lens 19 configure a lens integrator optical system that uniformizes the light output from the solid-state light source 11.

The color separation light guiding optical system 20 includes dichroic mirrors 21 and 22, reflection mirrors 23 to 25, relay lenses 26 and 27, and light collecting lenses 28R, 28G, and 28B. The color separation light guiding optical system 20 separates the light emitted from the illumination device 10 into red light, green light, and blue light and guides the separated light respectively to the liquid crystal optical modulation devices 30R, 30G, and 30B. Each of the dichroic mirrors 21 and 22 is a mirror in which a wavelength selecting transmission film that reflects light of a predetermined wavelength region and transmits light of other wavelength regions is formed on a transparent substrate. To be more specific, the dichroic mirror 21 transmits a red light component and reflects a green light component and a blue light component, and the dichroic mirror 22 reflects the green light component and transmits the blue light component.

The reflection mirror 23 is a mirror that reflects the red light component, and the reflection mirrors 24 and 25 are mirrors that reflect the blue light component. The relay lens 26 is disposed between the dichroic mirror 22 and the reflection mirror 24, and the relay lens 27 is disposed between the reflection mirror 24 and the reflection mirror 25. Since the length of the optical path of the blue light is longer than those of the optical paths of other color light, the relay lenses 26 and 27 are disposed so as to prevent a decrease in the use efficiency of light due to radiation of light or the like. The light collecting lenses 28R, 28G, and 28B collect the red light component reflected by the reflection mirror 23, the green light component reflected by the dichroic mirror 22, and the blue light component reflected by the reflection mirror 25 at the image forming areas of the liquid crystal optical modulation devices 30R, 30G, and 30B.

The red light passing through the dichroic mirror 21 is reflected by the reflection mirror 23 and is incident to the image forming area of the liquid crystal optical modulation device 30R for red light through the light collecting lens 28R. The green light reflected by the dichroic mirror 21 is reflected by the dichroic mirror 22 and is incident to the image forming area of the liquid crystal optical modulation device 30G for green light through the light collecting lens 28G. The blue light that is reflected by the dichroic mirror 21 and passes through the dichroic mirror 22 is incident to the image forming area of the liquid crystal optical modulation device 30B for blue light sequentially through the relay lens 26, the reflection mirror 24, the relay lens 27, the reflection mirror 25, and the light collecting lens 28B.

The liquid crystal optical modulation devices 30R, 30G, and 30B generate red image light, green image light, and blue image light by modulating the incident color light in accordance with an image signal input from the outside. Although not shown in FIG. 1, incident-side polarizing plates are interposed between the light collecting lenses 28R, 28G, and 28B and the liquid crystal optical modulation devices 30R, 30G, and 30B, and outgoing-side polarizing plates are interposed between the liquid crystal optical modulation devices 30R, 30G, and 30B and the cross dichroic prism 40.

Each of the liquid crystal optical modulation devices 30R, 30G, and 30B is a liquid crystal optical modulation device of a transmissive type that is acquired by tightly sealing a liquid crystal as an electrooptic material between transparent glass substrates forming one pair and, for example, includes a polysilicon TFT (Thin Film Transistor) as a switching device. By modulating the polarization direction of the color light (linear polarized light) passing through the above-described incident-side polarizing plates, which are not shown in the figure, described above in accordance with switching operations of the switching devices disposed in the liquid crystal optical modulation devices 30R, 30G, and 30B, red image light, green image light, and blue image light according to an image signal are generated.

The cross dichroic prism 40 forms a color image by composing the image light output from the above-described outgoing-side polarizing plates not shown in the figure. To be more specific, the cross dichroic prism 40 is an optical member having an approximate cube shape that is formed by bonding four rectangular prisms. In addition, on the boundary faces that are acquired by bonding the rectangular prisms and have an approximately "X" shape, dielectric multi-layer films are formed. The dielectric multi-layer film formed on one boundary having an approximate "X" shape reflects red light, and the dielectric multi-layer film formed on the other boundary face reflects blue light. The red light and the blue light are bent by the dielectric multi-layer films so as to be aligned in the traveling direction of the green light, whereby the three types of color light are composed. The projection optical system 50 projects a color image composed by the cross dichroic prism 40 toward the screen SCR in an enlarged scale.

Figure 4:
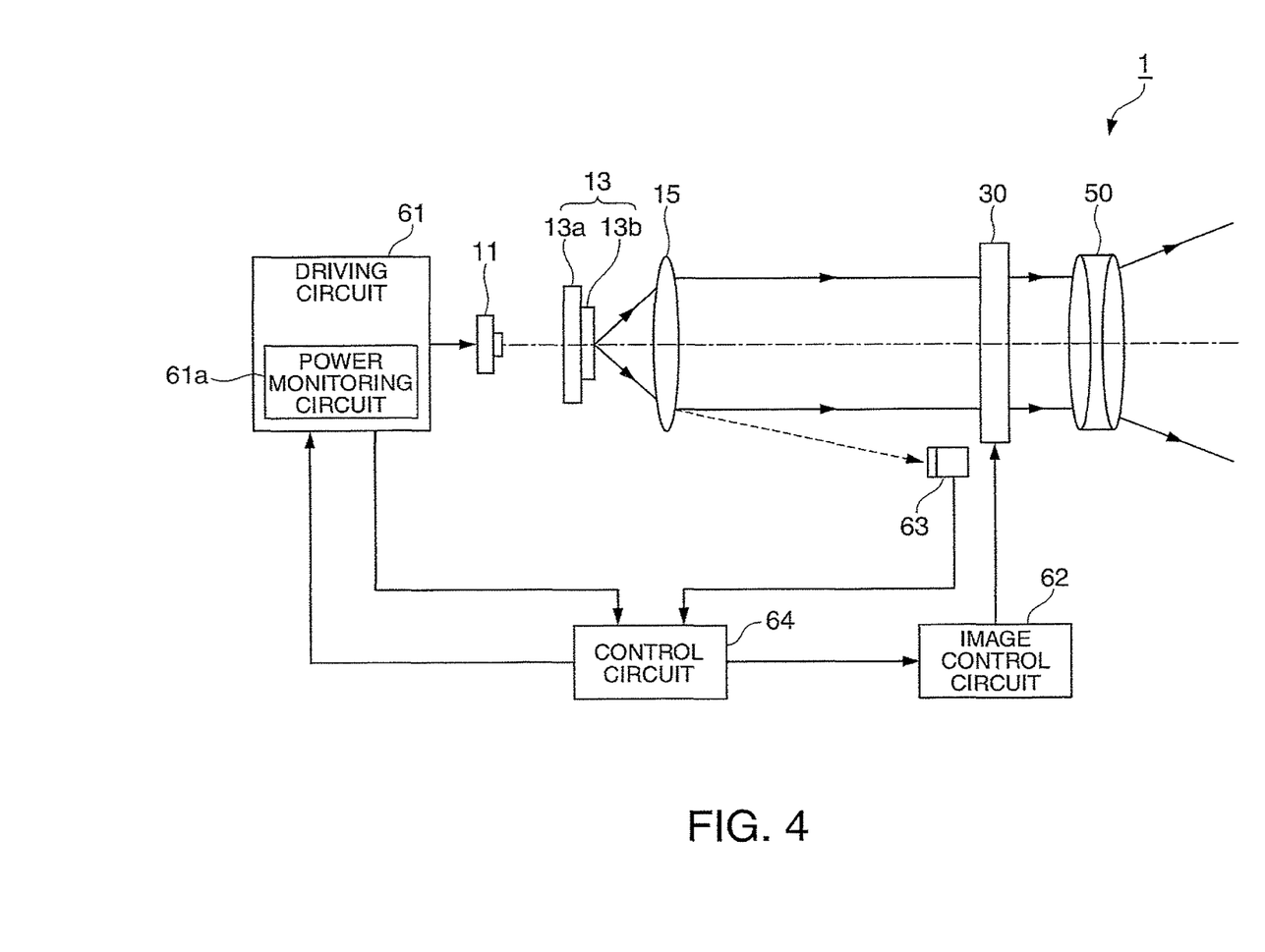
FIG. 4 is a block diagram showing the configuration of a main part of a control system that controls the operation of the projector according to the first embodiment of the invention.

Next, a control system that controls the operation of the projector 1 having the above-described configuration will be described. FIG. 4 is a block diagram showing the configuration of a main part of the control system that controls the operation of the projector according to the first embodiment of the invention. In FIG. 4, only members necessary for the description are extracted from the members shown in FIG. 1 and are shown in a simplified manner. As shown in FIG. 4, the projector 1 includes a driving circuit 61, an image control circuit 62, an optical sensor 63 (detection device), and a control circuit 64 (control device).

The driving circuit 61 drives the solid-state light source 11 under the control of the control circuit 64. This driving circuit 61 includes a power monitoring circuit 61a (monitoring device) that monitors the state of power supply to the solid-state light source 11 by detecting a driving voltage and a driving current for the solid-state light source 11. The monitoring result of the power monitoring circuit 61a is output to the control circuit 64, and by performing a control operation of the control circuit 64 by using the monitoring result of the power monitoring circuit 61a, the reliability and the accuracy of the control operation can be improved.

The image control circuit 62 controls the liquid crystal optical modulation device 30 (30R, 30G, and 30B) in accordance with an image signal input from the outside under the control of the control circuit 64, thereby generating red image light, green image light, and blue image light according to the image signal. In FIG. 4, for the simplification of the description, the liquid crystal optical modulation devices 30R, 30G, and 30B are simply shown as the liquid crystal optical modulation device 30.

The optical sensor 63 detects at least one of the blue light passing through the fluorescent body 13b disposed in the rotary fluorescent plate 13 and the yellow light (fluorescence) converted by the fluorescent body 13b, and, for example, a light intensity sensor that detects the light intensity of white light can be used. This optical sensor 63 is disposed so as to prevent a situation in which light emitted from the solid-state light source 11 is directly output to the outside due to damage to the fluorescent body 13b while checking the state of degradation of the fluorescent body 13b disposed in the rotary fluorescent plate 13.

The optical sensor 63 is disposed at a position deviated from an optical path between the fluorescent body 13b disposed in the rotary fluorescent plate 13 and the liquid crystal optical modulation device 30. The reason for this is for preventing the light output from the fluorescent body 13b and input to the liquid crystal optical modulation device 30 from being blocked by the optical sensor 63. However, the optical sensor 63 is disposed so as to be close to the optical path as much as possible. The reason for this is for detecting leakage light, which is not input to the liquid crystal optical modulation device 30, out of light output from the fluorescent body 13b to the liquid crystal optical modulation device 30. By detecting the leakage light, the blue light passing through the fluorescent body 13b and the yellow light (fluorescence) converted by the fluorescent body 13b can be detected.

To be more specific, in the projector 1 shown in FIG. 1, it is preferable that the optical sensor 63 is disposed at a position located between the illumination device 10, for example, from which uniform white light is emitted and any of the liquid crystal optical modulation devices 30R, 30G, and 30B and not blocking the light incident to the liquid crystal optical modulation devices 30R, 30G, and 30B. By disposing the optical sensor 63 at a position deviated from the optical path between the illumination device 10 and the dichroic mirror 21 disposed in the color separating light guiding optical system 20, the light intensity of white light emitted from the illumination device 10 can be detected.

In addition, by disposing the optical sensor 63 at a position deviated from the optical path between the dichroic mirror 21 and the liquid crystal optical modulation device 30R, the light intensity of red light can be detected. Furthermore, by disposing the optical sensor 63 at a position deviated from the optical path between the dichroic mirror 22 and the liquid crystal optical modulation device 30G, the light intensity of green light can be detected. In addition, by disposing the optical sensor 63 at a position deviated from the optical path between the dichroic mirror 22 and the liquid crystal optical modulation device 30B, the light intensity of blue light can be detected. Furthermore, by disposing the optical sensor 63 at a position deviated from the optical path between the dichroic mirrors 21 and 22, the light intensity of green light and blue light can be detected.

The control circuit 64 controls the overall operation of the projector 1. To be more specific, by controlling the driving circuit 61 by referring to the monitoring result of the power monitoring circuit 61a disposed in the driving circuit 61 and the detection result of the optical sensor 63, having no emission of light (stopping of light emission) and light emission of the solid-state light source 11, the light intensity of blue light emitted from the solid-state light source 11, and the like are controlled. In addition, by controlling the image control circuit 62, the transmittance of the liquid crystal optical modulation device 30 (30R, 30G, and 30B) and the like can be controlled.

Figure 5:
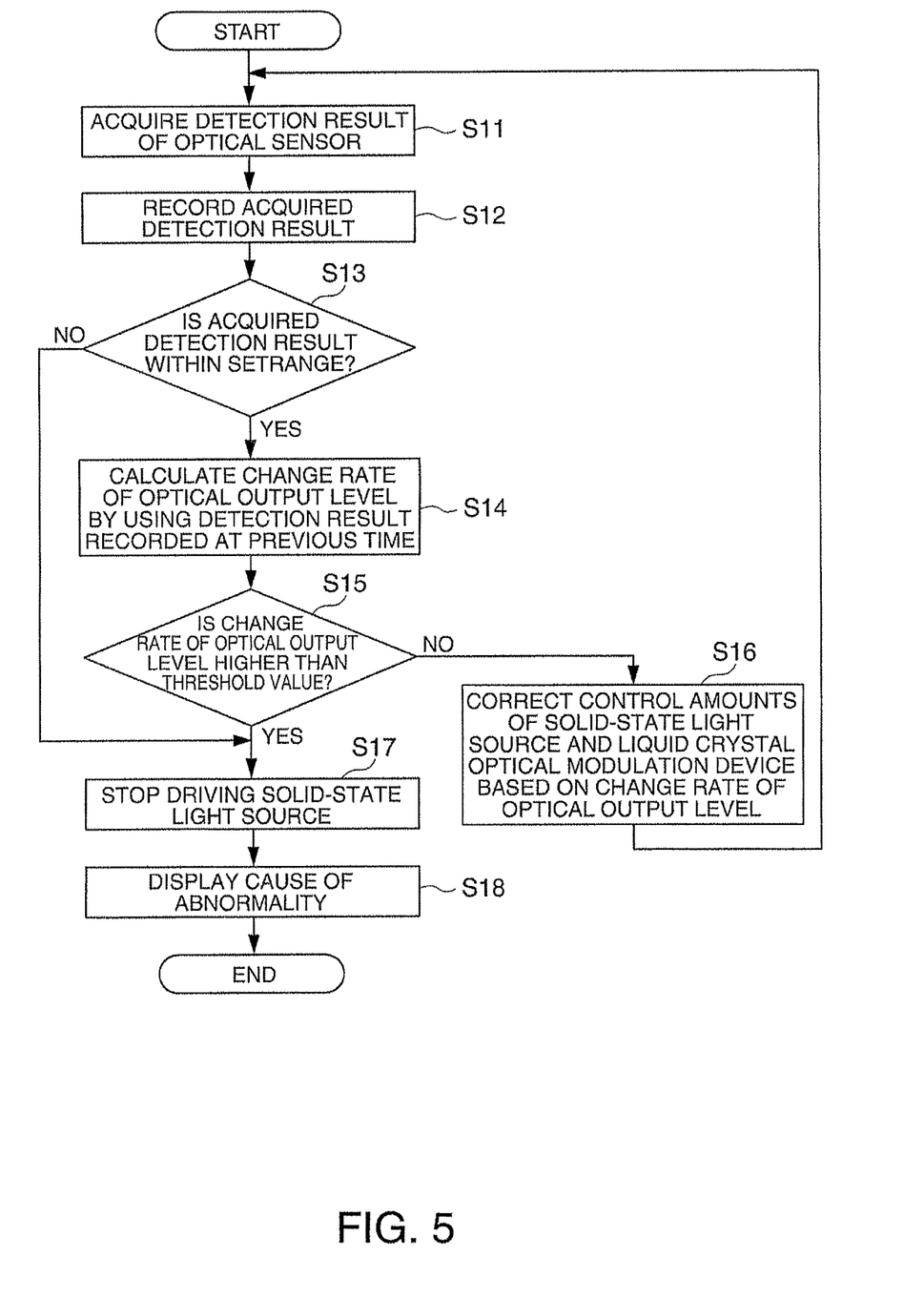
FIG. 5 is a flowchart showing an example of a control process performed by the projector according to the first embodiment of the invention.

Next, a control process performed by the control system having the above-described configuration will be described. FIG. 5 is a flowchart showing an example of the control process performed by the projector according to the first embodiment of the invention. The process illustrated in the flowchart shown in FIG. 5 is started, for example, by inputting power to the projector 1 so as to drive the solid-state light source 11 by using the driving circuit 61 and driving the rotary fluorescent plate 13 so as to rotate by using the motor 14. Here, for simplification of the description, it is assumed that the optical sensor 63 is disposed at a position deviated from the optical path between the illumination device 10 and the dichroic mirror 21 disposed in the color separating light guiding optical system 20.

When the solid-state light source 11 is driven by the driving circuit 61 under the control of the control circuit 64, blue light (excitation light) having a spectrum shown in FIG. 3A is emitted from the solid-state light source 11. The blue light emitted from the solid-state light source 11 is collected by the light collecting optical system 12 and is incident to the rotary fluorescent plate 13 that is driven so as to rotate by the motor 14. A part of the blue light incident to the rotary fluorescent plate 13 is converted into the yellow light (fluorescence) including the red light (R) and the green light (G) shown in FIG. 3B by the fluorescent body 13b formed in the rotary fluorescent plate 13, and the remaining part thereof passes through the fluorescent body 13b.

The blue light passing through the fluorescent body 13b and the yellow light (the red light and the green light) converted by the fluorescent body 13b is approximately parallelized by the collimator optical system 15, and the blue light and the yellow light are uniformized by sequentially passing through the first lens array 16 to the superposing lens 19, and the polarization state thereof is controlled so as to be emitted from the illumination device 10 as white light. The white light emitted from the illumination device 10 is separated into red light, green light, and blue light by the color separating light guiding optical system 20, and the red light, the green light, and the blue light that have been separated are incident to the liquid crystal optical modulation device 30 (30R, 30G, and 30B).

The red light, the green light, and the blue light incident to the liquid crystal optical modulation device 30 (30R, 30G, and 30B) are modulated in accordance with an image signal input from the outside, whereby red image light, green image light, and blue image light are generated. The generated image light is composed as a color image by the cross dichroic prism 40 and then is projected by the projection optical system 50 toward the screen SCR in an enlarged scale. Accordingly, an image according to an image signal input from the outside is displayed on the screen SCR.

Here, a part of leakage light, which is not incident to the liquid crystal optical modulation device 30, out of the white light that is output from the illumination device 10 and travels toward the liquid crystal optical modulation device 30 (30R, 30G, and 30B) is detected by the optical sensor 63. The control circuit 64 acquires the detection result of the optical sensor 63 (Step S11) and records the acquired detection result (Step S12). In addition, in a case where the detection result of the optical sensor 63 is to be recorded, although only the detection result may be recorded, the detection result may be recorded together with time at which the detection result is acquired.

When recording of the detection result of the sensor 63 is completed, the control circuit 64 determines whether or not the detection result acquired in Step S11 is within a range set in advance (Step S13). For example, it is determined whether or not the light intensity detected by the optical sensor 63 is between a maximum light intensity and a minimum light intensity of the illumination device 10, which are set in advance, or whether or not the detected light intensity is within the range of an error for a reference light intensity set in advance.

In a case where the detection result acquired in Step S11 is determined to be within the set range (in the case where the determination result of Step S13 is "Yes"), the control circuit 64 calculates a rate of change of the light intensity of the white light emitted from the illumination device 10 by using the detection result recorded at the previous time (Step S14). Here, as shown in FIG. 5, in a case where the determination result of Step S13 is Yes, the determination result of Step S15 to be described later is "No", the detection result of the optical sensor 63 is acquired and recorded at a predetermined time through the loop of Steps S11 to S16 (Steps S11 and S12).

Accordingly, the control circuit 64 calculates a rate of change of the light intensity of the white light emitted from the illumination device 10 by using the detection result of the optical sensor 63 that has been acquired and recorded at the previous time and the detection result of the optical sensor 63 that has been newly acquired in Step S11. In addition, since the detection results of the optical sensor 63 are sequentially recorded through the loop of Steps S11 to S16, it is possible to calculate an instant rate of change of the light intensity for one second or less, a change rage of the light intensity within several tens of seconds, a rate of change of the light intensity for every several minutes, a rate of change of the light intensity for every several hours, a rate of change of the light intensity from the shipment of the product, a rate of change of the light intensity from when the product is turned on, and the like in accordance with the capacity of a memory (not shown in the figure) included in the control circuit 64. The rate of change to be calculated is set by the control circuit 64 in advance.

When the rate of change of the light intensity is calculated, the control circuit 64 determines whether or not the rate of change is larger than a threshold value set in advance (Step S15). In a case that the rate of change calculated in Step S14 is determined to be equal to or less than the threshold value (in a case where the determination result is "No"), the control circuit 64 changes the light intensity of the blue light emitted from the solid-state light source 11 or the entire transmittance of the liquid crystal optical modulation device 30 (30R, 30G, and 30B) by correcting a control amount for the driving circuit 61 or the image control circuit 62 in accordance with the rate of change. In other words, in a case where the rate of change of the light intensity is low, the light intensity and the like are controlled in accordance with the change in the light intensity. When the process of Step S16 is completed, the process is returned to the process of Step S11.

In contrast to this, in a case where the rate of change calculated in Step S14 is determined to be larger than the threshold value (in a case where the determination result of Step S15 is "Yes"), the control circuit 64 performs a control process of stopping the driving of the solid-state light source 11 for the driving circuit 61 (Step S17). In other words, when a sudden change in the optical intensity occurs regardless of determining that the detection result acquired in Step S11 is determined to be within the set range in Step S13, the degradation of the solid-state light source 11 or the fluorescent body 13b or an increase in the temperature thereof is determined to have occurred. Accordingly, in order to prevent the lifetime from being suddenly shortened, the driving of the solid-state light source 11 is stopped. Then, the control circuit 64 displays the cause of the abnormality (for example, the occurrence of a sudden change in the light intensity or the like) on a display device (not shown in the figure) disposed in the projector 1 (Step S18).

On the other hand, in a case where it is determined that the detection result acquired in Step S11 is out of the set range (in a case where the determination result of Step S13 is "No"), the control circuit 64 performs a control process of stopping the driving of the solid-state light source 11 for the driving circuit 61 (Step S17). In other words, since white light having a light intensity that is out of the set range is emitted from the illumination device 10, the driving of the solid-state light source 11 is stopped in consideration of safety.

At this time, the control circuit 64 can estimate an approximate cause of the occurrence of the abnormality by referring to the monitoring result of the power monitoring circuit 61a disposed in the driving circuit 61. For example, in a case where the detection result of the optical sensor 63 is out of the set range regardless of no change in the driving current for the solid-state light source 11, the peeling-off of the fluorescent body 13b or the destruction of the rotary fluorescent plate 13 in which the fluorescent body 13b is formed can be estimated as the cause. When the peeling-off of the fluorescent body 13b or the like occurs, the blue light emitted from the solid-state light source 11 may be directly output to the outside of the projector 1, and accordingly, the light emission of the solid-state light source 11 is preferably stopped in consideration of the safety.

When the light emission of the solid-state light source 11 is stopped, the control circuit 64 displays a cause of the abnormality (for example, the occurrence of peeling-off of the fluorescent body 13b) on the display device (not shown in the figure) disposed in the projector 1 (Step S18). In addition, by performing the process of Step S18, the series of processes of the flowchart shown in FIG. 5 is completed. Here, in a case where the driving of the solid-state light source 11 is stopped in Step S17, together with the stopping of the driving the solid-state light source 11, a control process of reducing the entire transmittance of the liquid crystal optical modulation device 30 (30R, 30G, and 30B) by a large amount may be performed. By performing such a control process, the light intensity of color light passing through the liquid crystal optical modulation device 30 decreases by a large amount, and accordingly, the safety can be further improved. Alternatively, only the control process for the liquid crystal optical modulation device 30 may be performed without stopping the driving of the solid-state light source 11.

As above, according to this embodiment, the optical sensor 63 that detects at least one of blue light passing through the fluorescent body 13b and yellow light (red light and green light) converted by the fluorescent body 13b is arranged, and the solid-state light source 11 or the liquid crystal optical modulation device 30 (30R, 30G, and 30B) is controlled based on the detection result of the optical sensor 63. Accordingly, in a case where the fluorescent body 13b is damaged, a situation can be prevented in which light emitted from the solid-state light source 11 is directly output to the outside of the projector 1.

When the driving of the solid-state light source 11 is stopped in accordance with the detection result of the optical sensor 63, a situation can be prevented in which the blue light, which has a high output level, emitted from the solid-state light source 11 is transferred to a path other than the supposed path inside the projector 1, and the internal damage of the projector 1 increases. In addition, according to this embodiment, the degraded state of the solid-state light source 11 or the fluorescent body 13b is checked based on the detection result of the optical sensor 63. Accordingly, by driving the solid-state light source 11 based on the degraded state, the lifetime of the solid-state light source 11 or the fluorescent body 13b can be lengthened.

Furthermore, according to this embodiment, as described with reference to FIG. 5, the control circuit 64 records the detection result of the optical sensor 63. When the detection result of the optical sensor 63 is allowed to remain as a recording history, it can be used as useful information at the time of a service such as repair. In addition, according to this embodiment, the degraded state of the solid-state light source 11 or the fluorescent body 13b are checked as described above, accordingly, the product lifetime of the projector 1 can be estimated based on the degraded state. Therefore, for example, when it is close to the lifetime of the product, a user can be notified of such a situation.

Second Embodiment

Figure 6:
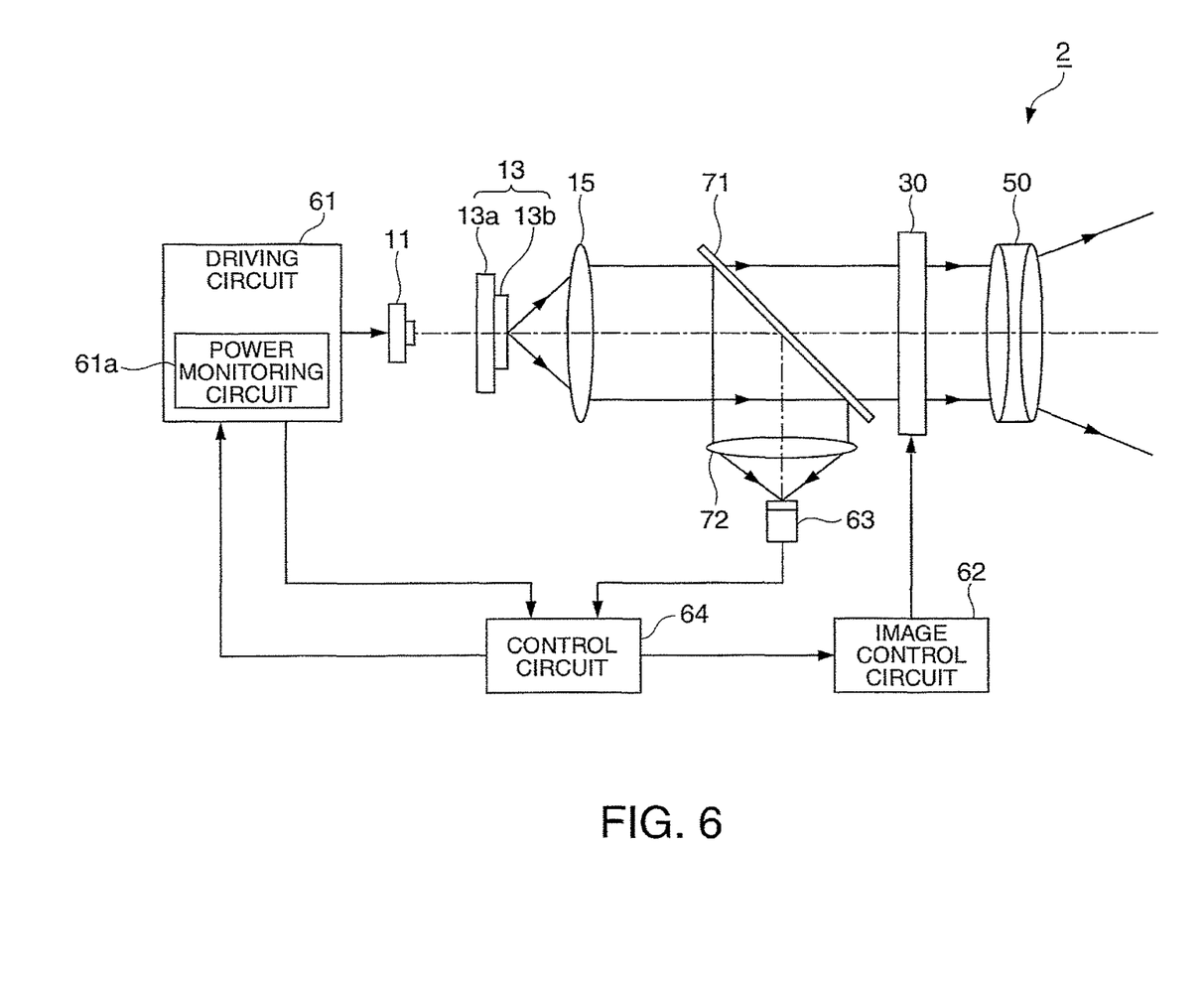
FIG. 6 is a diagram showing the configuration of a main part of a projector according to a second embodiment of the invention.

Next, a projector according to a second embodiment of the invention will be described. The entire configuration of the projector according to this embodiment is similar to that of the projector according to the first embodiment shown in FIG. 1. However, the arrangement of the optical sensor 63 in the projector according to this embodiment is different from that in the projector according to the first embodiment. FIG. 6 is a diagram showing the configuration of a main part of the projector according to the second embodiment of the invention. In FIG. 6, for easy understanding, only members, which are similar to the configuration shown in FIG. 4, are extracted from the members shown in FIG. 1 and are shown in a simplified manner.

As shown in FIG. 6, the projector 2 according to this embodiment includes a half mirror 71 (reflection optical system) and a light collecting lens 72 in addition to the configuration shown in FIG. 4. The half mirror 71 is disposed on an optical path between the fluorescent body 13b disposed in the rotary fluorescent plate 13 and the liquid crystal optical modulation device 30 and reflects apart (for example, about several %) of light (blue light passing through the fluorescent body 13b and yellow light (red light and green light) converted by the fluorescent body 13b) output from the fluorescent body 13b.

Similarly to the above-described first embodiment, the light intensity of white light, the light intensity of red light, the light intensity of green light, and the light intensity of blue light or the light intensity of the green light and the blue light can be detected in accordance with the position in which the half mirror 71 is arranged. To be more specific, by disposing the half mirror 71 on an optical path between the illumination device 10 and the dichroic mirror 21 disposed in the color separating light guiding optical system 20, the light intensity of the white light can be detected.

In addition, by disposing the half mirror 71 on an optical path between the dichroic mirror 21 and the liquid crystal optical modulation device 30R, the light intensity of the red light can be detected. Furthermore, by disposing the half mirror 71 on an optical path between the dichroic mirror 22 and the liquid crystal optical modulation device 30G, the light intensity of the green light can be detected. By disposing the half mirror 71 on an optical path between the dichroic mirror 22 and the liquid crystal optical modulation device 30B, the light intensity of the blue light can be detected. In addition, by disposing the optical sensor 63 on an optical path between the dichroic mirrors 21 and 22, the light intensity of the green light and the blue light can be detected.

The light collecting lens 72 collects light reflected by the half mirror 71. This light collecting lens 72 is disposed at a position, which is located on an optical path of light reflected by the half mirror 71, not blocking light output from the fluorescent body 13b to the liquid crystal optical modulation device 30. The optical sensor 63 is disposed at a position that is deviated from the optical path between the fluorescent body 13b and the liquid crystal optical modulation device 30 such that the light receiving surface is located at the focal point of the light collecting lens 72.

In the projector 2 having the above-described configuration, only a method of detecting the light output from the fluorescent body 13b is different from that in the projector 1 described in the first embodiment, and a control process (the control process illustrated in the flowchart shown in FIG. 5) that is similar to that of the first embodiment is performed in the projector 2 according to this embodiment. Accordingly, also in this embodiment, in a case where the fluorescent body 13b is damaged, a situation in which light emitted from the solid-state light source 11 is directly output to the outside of the projector 2 or a situation in which the internal damage of the projector 2 increases can be prevented.

In addition, also in this embodiment, since the degraded state of the solid-state light source 11 or the fluorescent body 13b can be checked, by driving the solid-state light source 11 based on the degraded state, the lifetime of the solid-state light source 11 or the fluorescent body 13b can be lengthened. Furthermore, by allowing the detection result of the optical sensor 63 to remain as a recording history, it can be used as useful information at the time of a service such as repair, or a user can be notified of the lifetime of the product.

Third Embodiment

Figure 7:
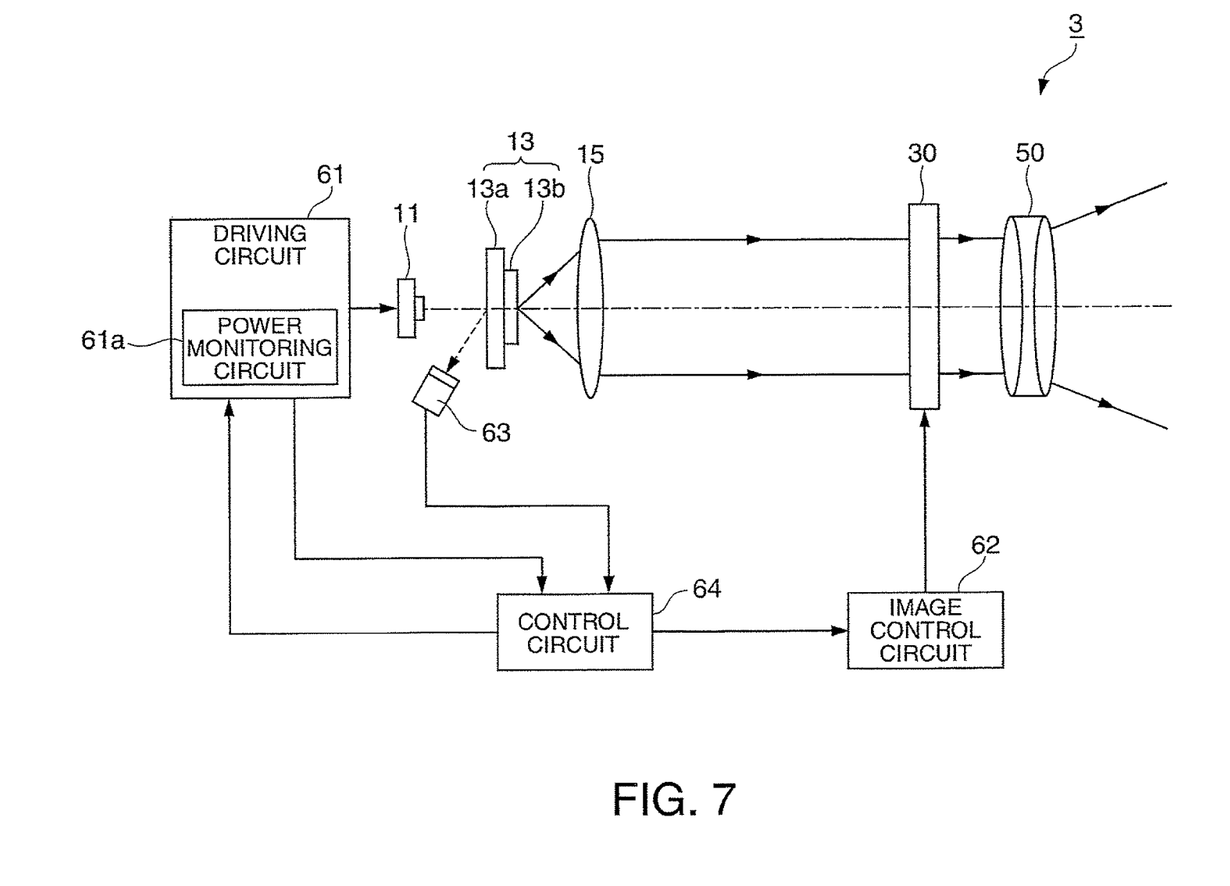
FIG. 7 is a diagram showing the configuration of a main part of a projector according to a third embodiment of the invention.

Next, a projector according to a third embodiment of the invention will be described. The entire configuration of the projector according to this embodiment is similar to that of the projector according to the first embodiment shown in FIG. 1. However, the arrangement of the optical sensor 63 in the projector according to this embodiment is different from those in the projectors according to the first and second embodiments. FIG. 7 is a diagram showing the configuration of a main part of the projector according to the third embodiment of the invention. In FIG. 7, similarly to FIG. 6, only members, which are similar to the configuration shown in FIG. 4, are extracted from the members shown in FIG. 1 and are shown in a simplified manner.

As shown in FIG. 7, the projector 3 according to this embodiment is configured so as to detect reflected light of blue light incident to the fluorescent body 13b by disposing the optical sensor 63 shown in FIG. 4 at a position deviated from the optical path between the solid-state light source 11 and the rotary fluorescent plate 13 in which the fluorescent body 13b is formed. In a case where blue light emitted from the solid-state light source 11 is directed detected, although the degraded state of the solid-state light source 11 can be checked, the degraded state of the fluorescent body 13b cannot be checked. In this embodiment, by detecting blue light reflected by the fluorescent body 13b by using the optical sensor 63, the degraded state of the fluorescent body 13b is checked.

The fluorescent body 13b, as described above, converts a part of the blue light emitted from the solid-state light source 11 into light (fluorescence) including red light and green light and transmits the remaining part of the blue light without conversion and reflects the incident light as little as possible. In a case where the peeling-off or the destruction of the fluorescent body 13b or damage in the rotary fluorescent plate 13 in which the fluorescent body 13b is formed occurs, the light intensity of the blue light reflected by the fluorescent body 13b changes. According to this embodiment, in a case where there is a change in the light intensity of the blue light reflected by the fluorescent body 13b, the occurrence of the peeling-off, the degradation, or the like of the fluorescent body 13b is determined.

In the projector 3 having the above-described configuration, only the arrangement of the optical sensor 63 and a detection target are different from those of the projector 1 described in the first embodiment, and, also in the projector 3 according to this embodiment, a control process (the control process illustrated in the flowchart shown in FIG. 5) similar to that of the first embodiment is performed. Thus, also in this embodiment, in a case where the fluorescent body 13b is damaged, a situation in which light emitted from the solid-state light source 11 is directly output to the outside of the projector 2 or a situation in which the internal damage of the projector 2 increases can be prevented.

In addition, also in this embodiment, since the degraded state of the solid-state light source 11 or the fluorescent body 13b can be checked, by driving the solid-state light source 11 based on the degraded state, the lifetime of the solid-state light source 11 or the fluorescent body 13b can be lengthened. Furthermore, by allowing the detection result of the optical sensor 63 to remain as a recording history, it can be used as useful information at the time of a service such as repair, or a user can be notified of the lifetime of the product.

In this embodiment, the optical sensor 63 is disposed at a position deviated from the optical path between the solid-state light source 11 and the rotary fluorescent plate 13 in which the fluorescent body 13b is formed, and only the reflected light of the blue light that is incident to the fluorescent body 13b is detected. However, by combining this embodiment with the above-described first and second embodiments, blue light reflected by the fluorescent body 13b, blue light passing through the fluorescent body 13b, and yellow light (red light and green light) converted by the fluorescent body 13b may be configured to be detected. Through such a combination, the color light of a detection target increases, and accordingly, the reliability or the accuracy of the control process can be improved.

Fourth Embodiment

Each of the above-described projectors according to the first to third embodiments includes a light intensity sensor that, for example, detects the intensity of white light as the optical sensor 63. In contrast to this, the projector according to this embodiment includes optical sensors that individually detect red light, green light, and blue light instead of the optical sensor 63 included in the projector according to any of the first to third embodiments.

The optical sensors that individually detect the red light, the green light, and the blue light, for example, are disposed at a position deviated from the optical path between the illumination device 10 and the dichroic mirror 21 disposed in the color separating light guiding optical system 20 as a whole and detect leakage light of white light that is emitted from the illumination device 10 and travels toward the liquid crystal optical modulation device 30 or white light reflected by the half mirror 71. By disposing the optical sensors at such a position as a whole, red light, green light, and blue light included in the white light emitted from the illumination device 10 can be individually detected.

In addition, the optical sensors that individually detect the red light, the green light, and the blue light, for example, are separately disposed at positions deviated from the optical path of the red light, the green light and the blue light within the color separating light guiding optical system 20. To be more specific, the optical sensor that detects red light is disposed at a position deviated from an optical path between the dichroic mirror 21 and the liquid crystal optical modulation device 30R, the optical sensor that detects green light is disposed at a position deviated from an optical path between the dichroic mirror 22 and the liquid crystal optical modulation device 30G, and the optical sensor that detects blue light is disposed at a position deviated from an optical path between the dichroic mirror 22 and the liquid crystal optical modulation device 30B. By separately disposing the optical sensors at the positions, the red light, the green light, and the blue light that are separated by the color separating light guiding optical system 20 can be individually detected.

In the projector according to this embodiment, only the types and the arrangement of the optical sensors are different from those of the projector 1 described in the first embodiment, and, also in the projector according to this embodiment, a control process (the control process illustrated in the flowchart shown in FIG. 5) similar to that of the first embodiment is performed. Therefore, according to this embodiment, advantages similar to those of the first embodiment can be acquired.

Here, according to this embodiment, since red light, green light, and blue light are individually detected, the degradation of the fluorescent body 13b and the like can be checked more precisely, whereby the reliability and the accuracy of the control process can be further improved. In addition, by controlling the image control circuit 62 by using the control circuit 64 based on the detection result of the red light, the green light, and the blue light that have been individually detected, a color change of an image displayed on the screen SCR can be reduced.

As above, although projectors according to embodiments of the invention have been described, the invention is not limited to the above-described embodiments, and a change can be freely changed within the scope of the invention. For example, modified examples described below can be applied.

(1) In the above-described embodiments, although an example has been described in which the liquid crystal optical modulation device is used as the optical modulation device, the invention is not limited thereto. As the optical modulation device, generally, a device that modulates incident light in accordance with an image signal may be used. Thus, a light valve, a micro-mirror type optical modulation device, or the like can be used. As the micro-mirror type optical modulation device, for example, a DMD (Digital Micro-mirror Device) (a trademark of Texas Instruments, Inc.) can be used.

A projector that includes the DMD as the optical modulation device includes a color wheel that sequentially transmits red light, green light, and blue light that are included in the white light emitted from the light source, and the red light, the green light, and the blue light transmitted through the color wheel are sequentially modulated by one DMD. Accordingly, by disposing an optical sensor such as the optical sensor 63 shown in FIG. 4 at a position deviated from the optical path between the color wheel and the DMD and detecting light (the red light, the green light, and the blue light) being transmitted through the color wheel in synchronization with the rotation of the color wheel, the light intensities of the red light, the green light, and the blue light can be individually detected.

(2) In the above-described embodiment, although a configuration has been described which includes the solid-state light source 11 that emits blue light as the excitation light and the rotary fluorescent plate 13 that converts apart of the blue light emitted from the solid-state light source 11 into red light and green light, the invention is not limited thereto. For example, a configuration may be employed which includes a solid-state light source that emits violet light or ultraviolet light as the excitation light and a rotary fluorescent plate that generates color light including red light, green light, and blue light from the violet light or ultraviolet light.

(3) In the above-described embodiment, although a transmissive-type projector has been described as an example of the projector, the invention is not limited thereto. For example, the invention may be applied to a reflective-type projector. Here, while "transmissive-type" means that the optical modulation device transmits light as in a transmissive-type liquid crystal display device or the like, and "reflective-type" means that the optical modulation device reflects light as in a reflective-type liquid crystal display device or the like. Even in a case where the invention is applied to a reflective-type projector, advantages similar to those of the transmissive-type projector can be acquired.

(4) In the above-described embodiments, although a projector using three liquid crystal optical modulation devices has been described as an example, the invention is not limited thereto. Thus, the invention can be applied to a projector that uses one, two, or four or more liquid crystal optical modulation devices.

(5) The invention can be applied to a front projection-type projector that projects a projection image from the observation side or a rear projection-type projector that projects a projection image from a side opposite to the observation side.

The entire disclosure of Japanese Patent Application No. 2010-189681, filed Aug. 26, 2010 is expressly incorporated by reference herein.

What is claimed is:

1. A projector comprising:
a solid-state light source that emits excitation light;
a fluorescent body that converts the excitation light into fluorescence;
an optical modulation device that modulates light output from the fluorescent body;
a projection optical system that projects the light modulated by the optical modulation device on a screen;
a detection device that detects at least one of the excitation light passing through the fluorescent body and the fluorescence converted by the fluorescent body; and
a control device that controls at least one of the solid-state light source and the optical modulation device based on a detection result of the detection device,
wherein the detection device detects a state of degradation of the fluorescent body, and
wherein the control device controls at least one of the solid-state light source and the optical modulation device based on the state of degradation of the fluorescent body.

2. The projector according to claim 1, wherein the detection device is disposed at a position deviated from an optical path between the fluorescent body and the optical modulation device and detects leakage light, which is not input to the optical modulation device, out of light output from the fluorescent body to the optical modulation device.

3. The projector according to claim 1, further comprising:
a reflection optical system that is disposed on an optical path between the fluorescent body and the optical modulation device and reflects a part of light output from the fluorescent body,
wherein the detection device is disposed at a position deviated from the optical path between the fluorescent body and the optical modulation device and detects light reflected by the reflection optical system.

4. The projector according to claim 1, wherein the detection device is disposed at a position deviated from an optical path between the solid-state light source and the fluorescent body and detects reflection light of the excitation light that is incident to the fluorescent body.

5. The projector according to claim 1, wherein the detection device detects at least one of the excitation light passing through the fluorescent body and the fluorescence converted by the fluorescent body for light of each color.

6. The projector according to claim 1, wherein the control device performs control of stopping emission of the excitation light for the solid-state light source and performs control of lowering transmittance of light for the optical modulation device.

7. The projector according to claim 1, further comprising:
a monitoring device that monitors a power supply status for the solid-state light source,
wherein the control device controls the solid-state light source while referring to a monitoring result of the monitoring device.

8. The projector according to claim 1, further comprising:
a rotary fluorescent plate in which the fluorescent body is continuously formed along a circumferential direction of a circular plate that can be rotated by a motor.

9. The projector according to claim 8,
wherein the solid-state light source emits blue light as the excitation light, and
wherein the fluorescent body converts the blue light emitted from the solid-state light source into light including red light and green light.

10. The projector according to claim 8,
wherein the solid-state light source emits violet light or ultraviolet light as the excitation light, and
wherein the fluorescent body converts the violet light or the ultraviolet light emitted from the solid-state light source into light including red light, green light, and blue light.

11. The projector according to claim 1, further comprising:
a monitoring device that monitors a power supply status for the solid-state light source,
wherein the control device controls at least one of the solid-state light source and the optical modulation device based on a monitoring result of the monitoring device and the detection result of the detection device.

12. The projector according to claim 1,
wherein the control device estimates a product lifetime of the projector based on the state of degradation of the fluorescent body, and
wherein the control device notifies user of the product lifetime.

13. The projector according to claim 1, wherein the control device controls the projection optical system so as to display the cause of the abnormality.

14. The projector according to claim 1, wherein the detection result generated by the detection device is recorded and compared to a predetermined range of acceptable light amount.

15. The projector according to claim 14,
wherein the control device calculates a change rate of the light amount based on the detection result that has been recorded at the previous time and the detection result that has been newly recorded, and
wherein the control device compares the change rate calculated to a predetermined value of acceptable change rate.

\* \* \* \* \*